(12) United States Patent
Caldewey

(10) Patent No.: US 10,130,216 B2
(45) Date of Patent: Nov. 20, 2018

(54) ELECTRICALLY OPERATED KITCHEN APPLIANCE

(71) Applicant: Vorwerk & Co. Interholding GmbH, Wuppertal (DE)

(72) Inventor: Uwe Caldewey, Dortmund (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 552 days.

(21) Appl. No.: 14/421,535

(22) PCT Filed: Aug. 2, 2013

(86) PCT No.: PCT/EP2013/066305
§ 371 (c)(1),
(2) Date: Feb. 13, 2015

(87) PCT Pub. No.: WO2014/026866
PCT Pub. Date: Feb. 20, 2014

(65) Prior Publication Data
US 2015/0208868 A1    Jul. 30, 2015

(30) Foreign Application Priority Data

Aug. 16, 2012 (DE) .......... 10 2012 107 518
Jul. 23, 2013 (DE) .......... 10 2013 012 192

(51) Int. Cl.
A47J 43/046    (2006.01)
A47J 43/07     (2006.01)
(Continued)

(52) U.S. Cl.
CPC .......... *A47J 43/0777* (2013.01); *A47J 36/10* (2013.01); *A47J 43/046* (2013.01);
(Continued)

(58) Field of Classification Search
CPC ..................................................... A47J 43/046
(Continued)

(56) References Cited

U.S. PATENT DOCUMENTS 4,517,502 A    5/1985  Aschoff et al.
5,129,536 A *  7/1992  Robinson ............... A47G 19/30
                                                   220/211
(Continued)

FOREIGN PATENT DOCUMENTS

AU    2011310829 B2    4/2012
DE    102010016248 A1  10/2011
(Continued)

OTHER PUBLICATIONS

International Search Report of PCT/EP2013/066305, dated Nov. 13, 2013.
(Continued)

Primary Examiner — David L Sorkin
(74) Attorney, Agent, or Firm — Collard & Roe, P.C.

(57) ABSTRACT

An electrically operated kitchen appliance includes a mixing container, an electric-motor operated mixer in the mixing container, and a lid for the mixing container, wherein the lid preferably can be locked by an electric motor. A combination of at least the following features is proposed: the electric motor (19) producing the locking has an output power of 1 to 10 watts; the electric motor acts on a locking part via a reduction gear train having a reduction greater than 50:1; the electric motor is a direct-current motor. A kitchen appliance of the type in question may furthermore have a first electric motor for locking the lid and a second electric motor for driving the mixer. The kitchen appliance may be designed in such a way that, when a rotational speed of the mixer is preselected, the first electric motor first performs the lid (Continued)

locking independently and the second electric motor is released to drive the mixer thereafter.

14 Claims, 4 Drawing Sheets

(51) Int. Cl.
*A47J 36/10* (2006.01)
*A47J 43/08* (2006.01)
*B01F 13/04* (2006.01)
*B01F 15/00* (2006.01)

(52) U.S. Cl.
CPC ......... *A47J 43/0716* (2013.01); *A47J 43/085* (2013.01); *B01F 13/047* (2013.01); *B01F 15/00201* (2013.01); *B01F 15/00538* (2013.01); *B01F 2215/0014* (2013.01)

(58) Field of Classification Search
USPC .............. 366/205, 206, 314, 601; 241/37.5
See application file for complete search history.

(56) References Cited

U.S. PATENT DOCUMENTS

| | | | |
|---|---|---|---|
| 6,340,124 B1 | 1/2002 | Charles et al. | |
| 6,513,966 B1* | 2/2003 | Gort-Barten | A47J 43/0766 241/37.5 |
| 6,637,681 B1* | 10/2003 | Planca | A47J 43/0777 241/37.5 |
| 9,290,307 B2 | 3/2016 | Arnold et al. | |
| 2013/0206771 A1* | 8/2013 | Arnold | A47J 36/10 220/315 |

FOREIGN PATENT DOCUMENTS

| | | |
|---|---|---|
| DE | 102010016250 A1 | 10/2011 |
| DE | 10 2010 017 719 A1 | 1/2012 |
| DE | 10 2011 051 149 A1 | 4/2012 |
| EP | 0638273 A1 | 2/1995 |
| EP | 1018918 B1 | 7/2003 |
| EP | 2371251 B1 | 10/2011 |
| EP | 2522261 A1 | 11/2012 |
| EP | 2522263 A1 | 11/2012 |
| EP | 2529650 A1 | 12/2012 |
| JP | 7298986 A | 11/1995 |
| KR | 2003010171 A | 2/2003 |
| WO | 2012041660 A1 | 4/2012 |

OTHER PUBLICATIONS

Extract from Allan R. Hambley, "Elettrotecnica", printed in Italy, Pearson Paravia Bruno Mondadori S.p.A (2009) (15 pages).
Extract from Allan R. Hambley, "Elettrotecnica", printed in Italy, Pearson Paravia Bruno Mondadori S.p.A (2009) with English Translation of annotated parts (15 pages).
Cytron Technologies, SPG30 Series Specification Sheet (filed in Opposition Feb. 3, 2017).
Cytron Technologies, "DC Geared Motor with Encoder", User's Manual, (May 2011) (8 pages).
Transmotec, "Planetary gear DC motors 1W-40W General catalogue" (Jan. 28, 2010) (13 pages).
Opposition dated Feb. 3, 2017 in EP 2 884 875 B1 (25 pages).

* cited by examiner

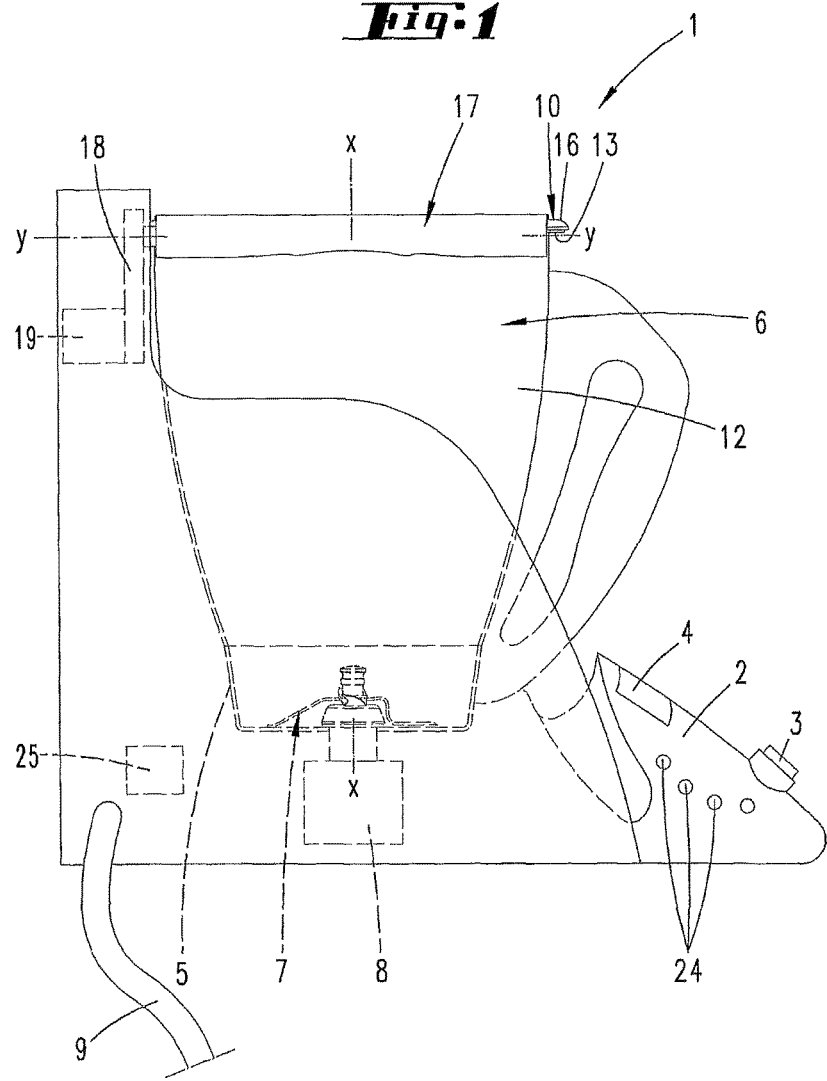

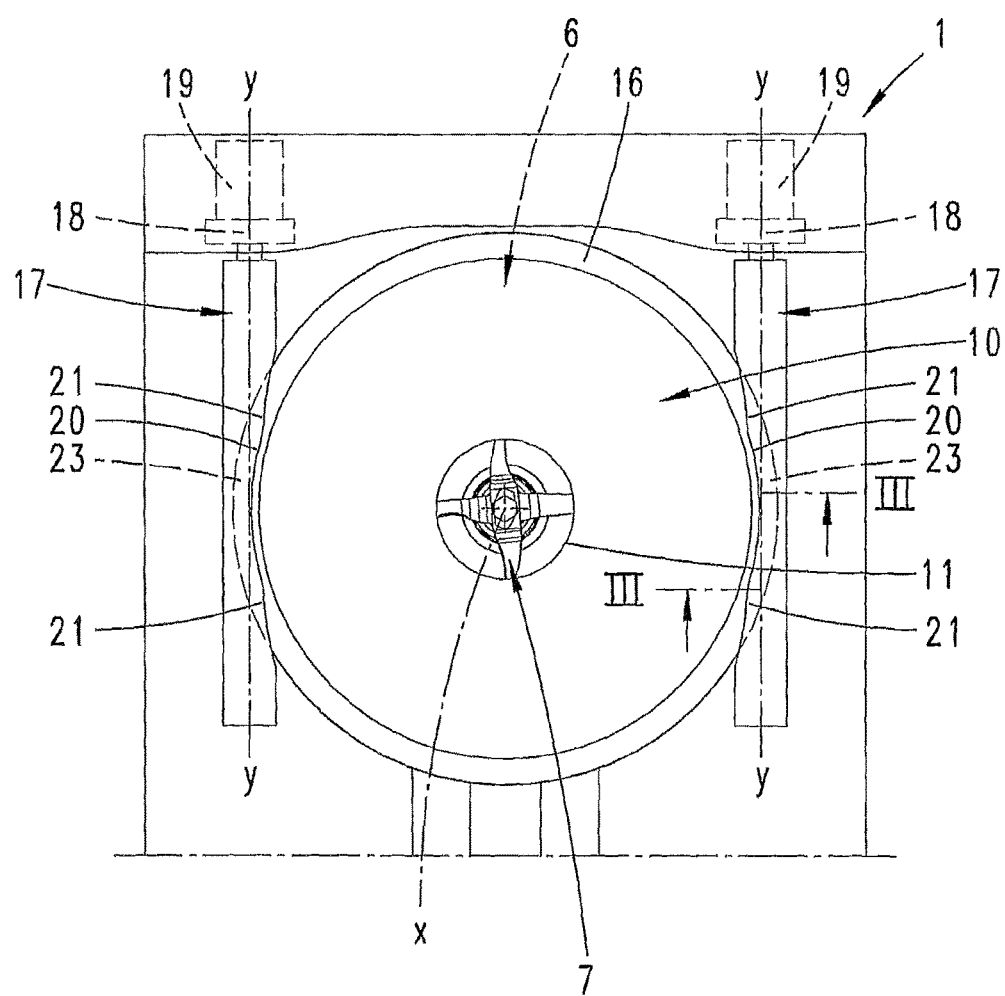

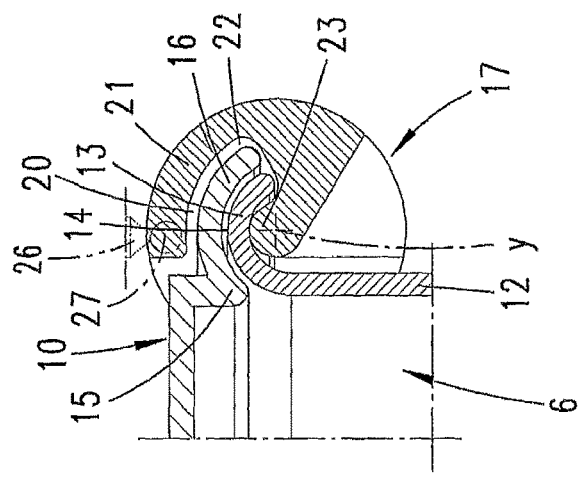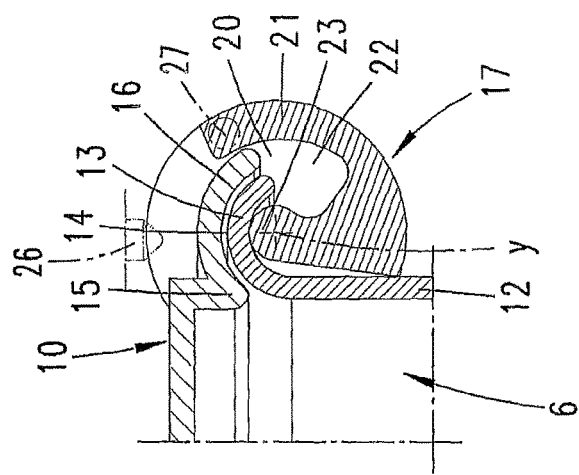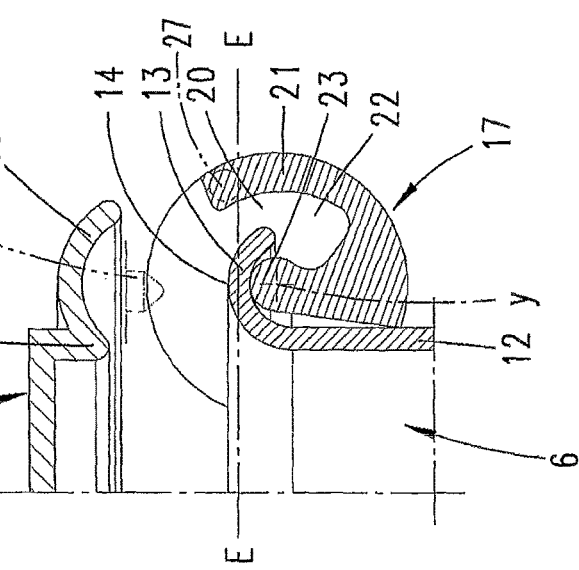

ELECTRICALLY OPERATED KITCHEN APPLIANCE

CROSS REFERENCE TO RELATED APPLICATIONS

This application is the National Stage of PCT/EP2013/066305 filed on Aug. 2, 2013, which claims priority under 35 U.S.C. § 119 of German Application Nos. 10 2012 107518.2 filed on Aug. 16, 2012 and 10 2013 012192.2 filed on Jul. 23, 2013, the disclosures of which are incorporated by reference. The international application under PCT article 21(2) was not published in English.

To begin with, the invention relates to an electrically operated kitchen appliance, comprising a mixing container, an electric-motor operated mixer in the mixing container, and a lid for the mixing container, wherein the lid preferably can be locked by an electric motor.

Kitchen appliances of the type in question are known. In particular in the household sector, they serve to process food, more preferably for preparing dishes. With regard to this, reference is made to DE 102010037892 A1, for example. The kitchen appliance described therein has a mixing container, which preferably can be removed from the machine housing. Preferably in the bottom area, said mixing container supports a mixer, which, in particular in assignment position of the mixing container in the kitchen appliance, can be driven via an electric motor on the kitchen appliance side. More particularly during operation of the kitchen appliance, thus preferably during operation of the mixer on the mixing container side, furthermore during operation of a heating device for the mixing container, which is provided more preferably, if applicable, an assignable lid engages over the mixing container. More preferably, this lid can be locked to the mixing container and/or to the kitchen appliance by an electric motor so as to prevent a lifting or removal of the lid, in particular during mixer operation, in this manner. To lock the lid, provision is made in the above-mentioned literature for electric-motor drivable locking parts, which, in the locking position, engage over the lid in the position attached to the mixing container, hereby more preferably simultaneously encompassing a container edge. With regard to this, it is furthermore known to embody the container edge, which interacts with the lid, as well as the area of the lid, which interacts with the container edge, to have a circular layout, whereby it is made possible to attach the lid to the mixing container, which is preferably non-directional in circumferential direction.

With regard to the above-described state of the art, a technical problem of the invention is seen in further improving a kitchen appliance of the type in question, in particular with regard to the lid locking.

According to a first idea of the invention, a possible solution of the task is at hand in the case of a kitchen appliance, wherein the focus is on a combination of at least the following features:
the electric motor producing the locking has an output power of 1 to 10 watts;
the electric motor acts on a locking part by means of a reduction gear train having a reduction greater than 50:1;
the electric motor is a direct-current motor.

As a result of the proposed solution, an embodiment, which is favorable in particular with regard to production as well as with regard to the user, for locking the lid to the mixing container and/or to the housing of the kitchen appliance, can be attained. The operation of the locking mechanism, in particular of the one or of the plurality of locking parts, preferably takes place via an electric motor, which is small with regard to performance and which, as a result of this, also has a design, which is small. Accordingly, the installation space required for arranging the electric motor in the kitchen appliance is also kept small. An electric motor, which has an output power of 1 to 10 watts, more preferably of 1 to 5 watts, is preferred hereby.

More preferably, the electric motor drives the locking part via a reduction gear train or acts thereon, respectively, for displacement in particular from a lid release position into the lid locking position and preferably also back into it. As a result of the preferred relatively high reduction preferably more than 50:1 to 200:1, a comparatively small electric motor comprising an output power of preferably 1 to 10 watts can also reach a relatively high locking torque. More preferably, a direct-current motor is used hereby.

Further features of the invention are explained below, also in the description of the figures, oftentimes in their preferred assignment to the subject matter of claim 1 or to the features of further claims. However, they can also be significant in an assignment to only individual features of claim 1 or of the respective further claim or in each case independently.

In a further preferred embodiment, provision is thus made for the locking operation to take place at least partially in overload operation. With this, high outputs can also be reached at least for a short time with a comparatively small electric motor of preferably 1 to 10 watts. Due to the fact that, in the preferred embodiment, the electric motor is only operated for a short time to displace the locking part in particular from the lid release position into lid locking position, such an operation is possible in the overload range.

It is also preferred for the motor current of the electric motor to be capable of being evaluated. The evaluation of the motor current allows for an evaluation with regard to the load of the electric motor. In a further preferred embodiment, the evaluation and preferably also a monitoring of the motor current takes place via a control module for the electric motor, more preferably via a microcontroller in the kitchen appliance. A current measurement value, which is excessive as compared to the usual operation of the electric motor—in consideration of the allowed overload operation—can be detected, for example, if the locking part, which is to be displaced, encounters a resistance prior to reaching the final locking position, but if the electric motor continues to try to displace the locking part towards the locking position. Such a situation can occur, for example, if the lid is not attached properly to the mixing container, furthermore for example in the event that the lid is tilted.

The microcontroller, which is preferably provided in this context, can display an error, which is generated in this manner via the increased motor current, for example on a display of the kitchen appliance.

In a further preferred embodiment, the direction of rotation of the electric motor can be reversed. This reversal of the direction of rotation is preferably used to displace the locking part from the lid locking position into the lid release position. The reversal preferably takes place via a microcontroller, which drives the electric motor as a whole, and, if applicable, which also monitors it. Preferably, the electric motor acts on the locking part in both directions of rotation by means of the reduction gear train.

In a preferred embodiment, a torque limitation can be carried out by monitoring the motor current. If an overload is detected as a result of monitoring the motor current, provision is made in a more preferred embodiment for a turn-off in response to a corresponding overload. Accordingly, in response to an interference, which is detected in this manner, in particular in the locking area, the electric motor no longer acts on the locking part, thus counteracting possible damages to the locking part and/or to the lid and/or to further device components.

Preferably, a reversal of the direction of rotation can be triggered by monitoring the motor current. If overload is detected, the direction of rotation of the motor is reversed accordingly, preferably independently, more preferably controlled via the microcontroller, so as to displace in particular the locking part back into the original position, that is, the lid release position.

More preferably, the motor is a 12 Volt direct-current motor, comprising a preferred nominal torque of 2.5 to 4, more preferably approximately 3.2 mNm. More preferably, the cut-out torque is hereby 3-times to 8-times the nominal torque, thus, for example, approximately 20 mNm.

In the case of a preferred nominal torque of between 300 and 500, in particular approximately 400 mA, the current in the locking process is furthermore approximately 3-times to 8-times the nominal current, thus, for example, approximately 2 A.

The invention further relates to an electrically operated kitchen appliance, comprising a mixing container, an electric-motor operated mixer in the mixing container, and a lid for the mixing container, wherein the lid can be locked by an electric motor, wherein furthermore a first electric motor is provided for locking the lid and a second electric motor is provided for driving the mixer.

Such a kitchen appliance is known from the above-cited literature.

With regard to the known state of the art, a technical problem of the invention is seen in further developing a kitchen appliance of the type in question in particular with regard to handling while maintaining operating safety.

According to a first idea of the invention, a possible solution of the task is provided in the case of a kitchen appliance, which focuses on the fact that the kitchen appliance is designed in such a way that, when a rotational speed of the mixer is preselected, the first electric motor first performs the lid locking independently and the second electric motor is released to drive the mixer thereafter. As a result of this embodiment, a favorable solution with regard to handling is created. In an advantageous manner, the user only places the lid on the mixing container. A rotational speed selection for the mixer, which is to preferably be provided thereafter, by the user, that is, more preferably as a result of a corresponding displacement of a speed switch or also after a corresponding input via a touchscreen display, for example, first effects an independent, automatic locking of the lid to the mixing container and/or to the kitchen appliance as a result of the proposed solution in an analogous manner. For this purpose, the rotational speed preselection is detected as such, preferably via a microcontroller on the machine side, which first converts this command into a control command for the first electric motor. After this, this first electric motor acts accordingly on a locking part in such a way that the latter is displaced into the position, which locks the lid. Preferably, the second electric motor is released to drive the mixer only when reaching the lid locking position of the locking part, that is, more preferably only when reaching an end position of the locking part, more preferably driving the mixer with the preselected rotational speed after this. This provides for a simplification of the operation of the device. In a preferred embodiment, a separate hand movement or a separate triggering does not need to be carried by the user to lock the lid.

In a further preferred embodiment, the release of the second electric motor to drive the mixer is spaced apart in time to the start-up of the first electric motor for locking the lid. In this context this time is more preferably predetermined, for example stored in a microcontroller, which can drive both electric motors.

Further features of the invention are explained below, also in the figure description, oftentimes in their preferred assignment to the subject matter of claim 8, or to the features of further claims. However, they can also be important when assigned to only individual features of claim 8 or the respective further claim or independently in each case.

Provision is thus made in a further preferred embodiment for an opening of the lid lock to take place independently after the time, for which a certain rotational speed had been preselected, has lapsed and the mixer was driven accordingly, wherein the opening takes place after a predetermined time has lapsed, starting with the standstill of the mixer. Accordingly, an independent lid unlocking is preferably at hand after the mixer is turned off. After the mixer comes to a standstill, the user can preferably lift the lid from the mixing container in an analogous manner, without first having to perform a separate unlocking hereby. Preferably, this applies in the case of a mixer operation, which is program-controlled and which is limited for a predetermined period of time, for example, as well as in the case of a possible manual turn-on and turn-off of the mixer, for example via a speed switch. In particular the mixer or the second electric motor, respectively, which drives the mixer, is monitored hereby, thus more preferably the motor current thereof. The standstill of the mixer can be determined via the monitoring, for example by means of the microcontroller. Said standstill first triggers or prompts, respectively, the opening of the lid locking. Preferably, the opening of the lid locking, that is, in particular the displacement of at least one locking part from the lid locking position back into the lid release position, does not take place immediately after standstill of the mixer, but preferably also spaced apart in time thereto. This waiting time is preferably predetermined, more preferably it is stored, for example in the microcontroller, which controls and monitors the electric motors, or can be accessed by it, respectively. More preferably, the predetermined time is hereby chosen in such a way that, for example a liquid column built up via the rotating mixer, which might press against the lid on the bottom side, is reduced until the lid release. Accordingly, this keeps the lid from coming off in response to a liquid column, which has not yet been calmed, and furthermore counteracts liquid, for example, from squirting out of the mixing container.

In a preferred embodiment, the predetermined time is different depending on the preselected rotational speed of the mixer. The predetermined time in the case of high rotational speeds of preferably several 1,000 U/min, for example 3,000, 8,000 or 10,000 U/min, is thus chosen to be longer than in the case of speeds of up to 1,000 U/min, for example 200, 500 or 800 U/min. More preferably, the predetermined time is determined by means of the set rotational speed of the mixer, this is done in particular via the microcontroller, which is preferably provided. Reference values stored in the microcontroller or in a further storage medium, preferably serve this purpose in an advantageous manner. In a further preferred embodiment in the case of very low rotational speeds of the mixer, the predetermined time equals from zero up to one or two seconds, because no liquid column or no liquid column, which acts significantly against the lid, forms in the case of these low rotational speeds with further proper filling of the mixing container. In the case of comparatively high rotational speeds of several 1,000 U/min, for example, provision is made for a delay time of preferably 1 to 5 seconds for releasing the lid.

More preferably, the time between mixer standstill and lid release is thus 100 ms up to 4 s. This time is substantially determined by the preset rotational speed. In the case of a high rotational speed of preferably more than 10,000 U/min, this time is preferably 4 s; in the case of low rotational speeds of less than 300 U/min, for example, this time is preferably 100 ms. The time values, which are furthermore chosen in such a way that a medium in the mixing container is calmed down to such an extent that it does not spill over the container edge when opening the lid, are preferably stored in an internal table.

The invention also relates to an electrically operated kitchen appliance, comprising a mixing container, an electric-motor operated mixer in the mixing container, and a lid for the mixing container, wherein the lid preferably can be locked by an electric motor from a locking position open.

Kitchen appliances of the type in question are known, thus in particular from the above-cited literature.

With regard to the known state of the art, a technical problem of the invention is seen in embodying a kitchen appliance of the type in question in a further improved manner, in particular with regard to the locking.

According to a first idea of the invention, a possible solution of the task is at hand in the case of a kitchen appliance, which focuses on the fact that the kitchen appliance is designed in such a way that the locking must have taken place within a certain period of time, for the purpose of which provision is made for sensors, which detect that the locking took place, and, in the alternative, an error message is output and/or the locking is set back into the state open. As a result of this embodiment, an advantageous locking monitoring is at hand. If the proper locking state is not reported via the sensor or the sensors within a certain period of time or within a time span, respectively, in particular with starting the locking process, this leads to a consequence, which more preferably does not permit the proper start-up of the kitchen appliance, in particular the start-up of the mixer and/or of further components, for example of a heater. In a preferred embodiment, the sensors are hereby contact sensors, more preferably sensors, which operate in a contact-free manner, such as, for example, proximity sensors or in the form of light barriers. Preferably, these sensors detects/detect at least one section of the locking part, which interacts in particular with the lid and which must have assumed a predetermined position in the proper locking position. If the sensor or the sensors, respectively, detect the proper locking state, a corresponding signal is generated, which triggers in particular the release of the further machine functions. If the proper locking state is not detected within the predetermined period of time, the sensors accordingly do not generate a signal within the predetermined period of time or generate a signal, which differs from the locking signal. In a preferred embodiment, this thus leads to an error message. Preferably, this error message is displayed to the user, thus for example by means of a correspondingly provided warning light or in a display, which also displays further functions of the kitchen appliance during operation thereof. An acoustic error message is also possible with regard to this. In the alternative or also additionally, the locking is set back into the state open. Accordingly, the locking part or the locking parts is/are displaced back independently into the initial position, that is, into the position, which releases the lid completely, if a final locking position has not been detected within the predetermined period of time. Preferably, this is reached as a result of the reversal of the direction of rotation of the electric motor, which preferably drives the locking part or the locking parts.

Further features of the invention are be explained below, also in the figure description, oftentimes in their preferred assignment to the subject matter of claim 11, or to the features of further claims. However, they can also be important when assigned to only individual features of claim 11 or to the respective further claim or independently in each case.

Preferably, the predetermined locking time is less than two seconds, up to <0.5 seconds. Within this time span, the sensor or the sensors must report the locking position or the final locking position, respectively, of the one or of the plurality of locking parts.

The features of the above-described independent claims 1, 6 and 9 are significant, in each case by themselves as well as in any combination with one another, wherein further features of an independent claim 1 and/or 6 and/or 9 can be combined with features of a further independent claim or with the features of a plurality of independent claims, and further also with only individual features of one or a plurality of the further independent claims.

With regard to the disclosure, the ranges or value ranges, respectively, or multiple ranges specified above and below also include all intermediate values, in particular in 1/10 steps of the respective dimension, if applicable also dimensionless, in particular 1.01-times, etc., on the one hand for narrowing down the mentioned boundaries from the bottom and/or top, in the alternative or additionally also with regard to the disclosure of one or a plurality of singular values from the respective specified range.

The invention is explained below by means of the enclosed drawing, which, however, represents only an exemplary embodiment.

FIG. 1 shows a kitchen appliance of the type in question in a schematic side view, comprising a cooking container, which is closed by means of a lid;

FIG. 2 shows the top view for this;

FIG. 3 shows the section according to the line III-III in FIG. 2, the locking position open, that is, relating to the lid release position;

FIG. 4 shows a sequential illustration to FIG. 3, after the lid was attached to a container edge;

FIG. 5 shows the lid locking position after displacing a locking part;

Figure 7:
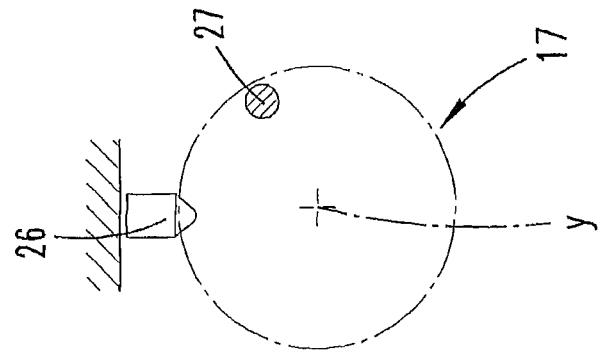
FIG. 7 shows a schematic sectional illustration of an end area of the locking part, comprising a switch provided on the machine side and a pin on the side of the lock.

With reference to FIG. 1, what is illustrated and described first is an electrically operated kitchen appliance 1.

First of all, said kitchen appliance has an operating field 2, preferably comprising a plurality of controllers 3 and/or push buttons 24 as well as preferably a display 4 for displaying the parameters, which can in particular be set via the controllers 3 and/or the push buttons 24.

The kitchen appliance 1 furthermore has a container accommodation 5.

A mixing container 6 in the form of a cooking container can be accommodated and held in said container accommodation, in particular in the base area thereof, preferably in a positive manner.

Preferably, the container 6 is embodied in a substantially rotationally symmetrical manner, comprising a central vertical axis x.

In the bottom area, the container 6 preferably encompasses a mixer 7. In the assignment position of the container 6 in the container accommodation 5, said mixer is coupled in a positive manner to a mixer drive, which is provided in the kitchen appliance 1.

The power supply of the electric motor 8, which forms the mixer drive, as well as a heater, which is more preferably provided on the bottom side of the container, and furthermore also the electrical control of the entire kitchen appliance 1 is attained via a power cord 9.

In particular during operation of the mixer 7 and/or of the heater 8, the container 6 is furthermore closed by means of a lid 10. Said lid encompasses a filling opening 11, preferably centrally, accommodating the vertical axis x of the container 6, this more preferably in the case of a layout of the lid 10, which, as a whole, substantially has the shape of a circular disc.

The container 6 encompasses a container wall 12, which extends from the bottom area upwards in vertical direction and which merges into a container edge 13, which projects radially outwards on the side of the container opening. With reference to a vertical cross section (see FIG. 3), said container edge is formed in the shape of the section of a circle, more preferably in a semicircular shape, comprising a curvature surface 14, which is oriented vertically upwards.

Figure 6:
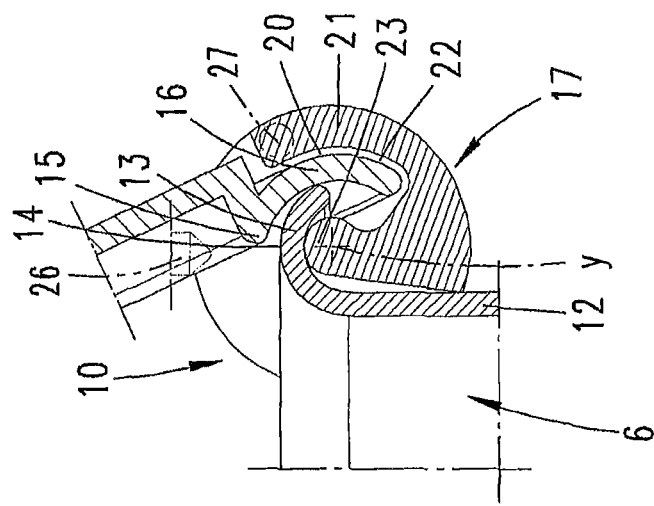
FIG. 6 shows a sectional illustration, which substantially corresponds to FIG. 5, but in the case of the lid not been attached properly and corresponding non-reaching of the locking position of the locking part.

On the bottom side, that is, in the assigned position, the lid 10 faces the interior of the container, provided with a circumferential collar 15, which extends substantially coaxially to the vertical axis x. A lid edge 16, which extends radially outwards, is integrally molded to the foot end of the collar 15, thus along the outer edge of the collar facing the interior of the container in the assigned position. With reference to a vertical section according to FIG. 6, adapted to the container edge 13, said lid edge extends in the shape of a section of a circle, more preferably running concentrically in assignment position of the lid 10, to the container edge 13. In the proper assignment position, the lid 10 is supported on the container edge 13 via the lid edge 16 thereof (see FIG. 3).

Albeit not illustrated, provision is made at the lid 10 or in the area of the container edge 13 for a seal, in particular for arranging the lid 10 on the container 6 in a fluid-tight manner. Typically, such a seal consists of a soft plastic material, for example of a thermoplastic elastomer.

In particular during operation of the kitchen appliance, furthermore in particular during the mixer and/or heating operation, the lid 10, which is attached to the container 6, must be locked, because, if applicable, high forces can be created in the container 6 during operation of the kitchen appliance 1, for example due to a comminution process by means of the mixer 7 and/or by means of a fluid dynamics. For this purpose, the kitchen appliance 1 encompasses at least one locking part 17, which locks the lid 10 against the container 6. This locking part 17 is preferably embodied so as to be elongated, in a wavelike manner, comprising a central axis, which is oriented in longitudinal extension and which simultaneously represents an axis of rotation y of the locking part 17.

In the illustrated embodiment, the arrangement of the axis of rotation y is furthermore chosen in such a way that it extends radially outside of the container edge 13, further in vertical overlap to the container edge 13 below it. It is more preferred hereby for the axis of rotation y to intersect the center point of the vessel edge 13, which has the shape of the section of a circle, with regard to a vertical section according to FIG. 3.

As a result of the above-described arrangement and orientation of the axis of rotation y, the cylindrical locking part 17, which is elongated as a whole, is arranged in such a way that, with reference to a top view (see FIG. 2), it intersects the container edge 13 and, in the assigned position, the lid edge 16 in a secant-like manner, wherein, in the illustrated exemplary embodiment, the axial length of the locking part 17 is chosen in such a way that both end areas thereof project freely beyond the edge area, which is encompassed partially in a secant-like manner, with regard to a top view.

One end of the locking part 17 is connected to an electric motor 19, which is arranged in the kitchen appliance 1, by interconnecting a reduction gear train 18. As illustrated, the arrangement of the electric motor 19 can be chosen in such a way that, in a vertical projection, the axis of rotation thereof coincides with the axis of rotation y of the locking part 17. The electric motor 19 preferably has an output power of 5 watts. Furthermore, it is preferably a direct-current motor. The electric motor acts on the locking part 17 via the drive 18 with a reduction preferably greater than 50:1.

The locking part 17 is fixed to the kitchen appliance 1 so as to be capable of being rotated about the axis y via the drive 18, this furthermore in the case of a freely projecting arrangement thereof as a whole.

The locking part 17, which is wavelike as a whole, is furthermore provided with a cavity 20, which, in the illustrated exemplary embodiment, preferably extends approximately across 60 to 70% of the axial length of the locking part 17. It is embodied in such a way that a circular arc-like engagement section 21 appears, in each case assigned to the end area of the cavity 20, viewed in axial direction, with reference to a vertical section, that is, with reference to a section viewed vertically to the axis of rotation y. Said engagement section preferably extends concentrically to the axis of rotation y, wherein, with regard to its radial extension as well as with regard to its extension in circumferential direction, the cavity section 22, which is covered by the engagement section 21, is designed to accommodate the vessel edge 13 as well as the lid edge 16 of the lid 10, which is attached to the vessel 6, in a positive manner. The engagement section 21, which extends so as to protrude freely with reference to a vertical section, preferably extends in a circular arc-like manner, in the illustrated exemplary embodiment across an area of approximately 80 to 85°.

Viewed in direction of extension of the axis of rotation y, the locking areas in the area of the engagement sections 21, which appear as a result of the above-described embodiment, are spaced apart from one another to an extent, which corresponds approximately to a third of the lid diameter in the illustrated exemplary embodiment.

Further viewed in the direction of extension of the axis of rotation y, a support area 23 is embodied centrally between the engagement sections 21. Said support area is preferably molded in spherical head-like manner or in a ball-like manner, in particular with reference to a vertical section according to FIG. 3, comprising a support surface, which runs concentrically to the axis of rotation y and thus, more preferably, in corresponding assignment position, concentrically to the course of the container edge 13 and/or of the lid edge 16 in a vertical section.

In the support area 23, the cavity 20 is formed in such a way that, in a lid release position according to FIG. 3, a free vertical lifting or lowering of the container 6, respectively, as well as of the lid 10 can be attained above the support area 23. As a result of the embodiment of the lid 10 in a circular disc-shaped manner as a whole, the lid can be assigned to the container edge in an undirected manner.

The axis of rotation y of the locking part 17 preferably extends through the center of the support area 23, so as to hold the container position constant in response to a rotation of the locking part 17.

In the assigned position (see FIG. 4), the container edge 13 rests on the surface of the support area 23, which is embodied in a crowned to spherical manner, wherein the container 6 is held vertically by the locking part 17, so as to be able to compensate for possible length tolerances between container 6 and container accommodation 5 in a well-directed manner on the underside of the container.

To operate the kitchen appliance 1, the lid 10 is attached, this is done by directly supporting the lid edge 16 on the container edge 13, if applicable by means of interconnecting a seal.

As a result of rotation of the locking part via the electric motor 19, the engagement sections 21, which are distanced to one another in axial direction, are displaced via the lid edge 16, into an end position according to FIG. 5, in which the locked state of the lid 10 is reached. Preferably, an axial tensioning of container 6 and lid 10 is not attained hereby. Instead, it is preferably only ensured that the container 6 and the lid 10 cannot be separated in the locked state, even by high forces. The tightness is ensured by means of the mentioned radial seal.

The kitchen appliance 1 further encompasses a microcontroller 25, which is accommodated in the machine housing. Said microcontroller serves in particular to drive the first electric motor 19 for rotationally displacing the locking part 17 as well as more preferably also the second electric motor 8 to drive the mixer 7. The microcontroller 25 is furthermore preferably designed to receive and the evaluate signals and/or data, thus further in particular in connection with a locking process and/or in connection with the mixer drive.

Preferably, provision is made at a locking part 17 for a section, which is to be detected by a sensor 26. In the illustrated exemplary embodiment, said section, which is to be detected, is a pin 27, which projects in axial direction at the area facing away from the free end of the locking part 17. In the case of a preferred arrangement of two locking parts 17, both locking parts 17 are provided with such a pin 27, to which a sensor 26 is in each case assigned in particular on the device side.

More preferably, the pin/sensor arrangement is provided on the inner side of the housing in a protected position, thus in the area of the drive 18, for example.

As a result of the rotation of the locking part 17 from a lid release position according to FIG. 3 towards a lid closing position according to FIG. 5, each pin 27 is hereby located on a concentric circle to the axis of rotation y, wherein the pin 27 of the locking part 17 acts on the respective assigned sensor 26—preferably in the form of an electric push button—in the proper locking position according to FIG. 5. The proper locking position of the lid 10 can be detected by means of a sensor through this.

Preferably when the kitchen appliance 1 is turned on, in which state in particular the microcontroller 25 as well as the controller 3 and/or switch 24 and the display 4 are activated, a rotational speed preselection for the mixer 7, which is effected by the user (for example via the push buttons 24), first leads to a locking of the lid 10.

Preferably, this locking is performed independently by the kitchen appliance 1, thus without further intervention from the user. The user needs to only properly attach the lid 10 to the stirring container 6 beforehand.

This process is coordinated via the microcontroller 25. Said microcontroller detects the input rotational speed command, which can furthermore also be at hand from a recipe control, which is stored on the machine side, and controls the first electric motor or the electric motors 19, respectively, to rotationally displace the locking parts 17.

Due to the preferably high reduction via the respective drive 18 (provision can also be made in this regard for only one common drive, comprising only one electric motor 19 for both locking parts 17), a high locking torque can also be attained by means of an electric motor, which is preferably small with regard to performance. Due to the fact that the electric motor is operated only briefly for displacing the locking part 17, provision is hereby made for an operation in the overload range and is possible.

As described above, the locking part 17 is hereby displaced by means of pivoting into the locking position illustrated in FIG. 5, wherein this final locking position is in each case confirmed by the pin 27, which acts on the assigned sensor 26.

In the case of arranging one sensor 26 at a time at every locking part 17, both sensors 26 must supply a corresponding locking signal in a preferred embodiment.

The sensor signal is detected by the microcontroller 25, which thereupon releases the second electric motor 8 for driving the mixer 7 at the predetermined rotational speed.

More preferably, the locking signal of the sensor or of the sensors 26 must be detected by the microcontroller 25 within a predetermined period of time. Preferably, the period of time starts when the process is started, more preferably when the preselected rotational speed is input or confirmed, respectively, by the user. In a further embodiment, the predetermined period of time starts with the driving of the electric motor 19, which displaces the locking part 17, by means of the microcontroller 25.

The sensor signal can thus preferably be detected by the microcontroller 25 within one second, more preferably within less than one second. If the microcontroller 25 registers the corresponding signal within this predetermined period of time, the microcontroller 25 releases the electric motor 8 to drive the mixer 7.

If, after the predetermined time, the microcontroller 25 does not detect a signal from the sensor 26 or a signal from both sensors 26, respectively, the microcontroller 25 evaluates this as an improper locking. Preferably, an error message, which is to prompt the user, for example, to check the lid position on the mixing container 6, is displayed on the display 4.

More preferably, such an error message or the absence of the sensor signal, respectively, leads to an independent rotational displacement of the locking part or of the locking parts 17 back into the lid release position according to FIG. 3.

In any event, the electric motor 8 for the mixer 7 is not released, if the sensor signal is absent.

In a further, non-illustrated embodiment, the absence of the lid 10 is also detected, for example further in response to the arrangement of a further sensor, the signal of which must be detected, if applicable in addition to the signals from the sensors 26, to release the mixer motor within the predetermined time. Such an absence of the lid 10 can also be detected by means of the sensors 26, which simultaneously scan the locking parts 17, thus further for example as a result of correspondingly rotating the locking parts 17 beyond the normal locking position. It hereby further turns out to be advantageous, if the lid 10 or the lid section, respectively, such as the lid edge 16, for example, serves as rotation stop limitation for the locking part 17.

For example, a lid tilt can have the result that at least one locking part 17 does not reach the proper locking position according to FIG. 5. Such a situation is illustrated in an exemplary manner in FIG. 6. Due to the fact that in such a case, the locking part 17 cannot reach the final locking position within the predetermined period of time, the microcontroller 25 preferably triggers the rotational re-displacement of the locking part 17 and furthermore preferably does not release the electric motor 8 for the mixer 7.

The microcontroller 25 preferably further also detects the motor current of the first electric motor 19 for displacing the locking part 17. The detected measuring values are preferably evaluated in the microcontroller 25. In a preferred embodiment, a torque limitation is attained through this. In addition, a turn-off of the electric motor is preferably also made possible through this in response to an overload, thus furthermore for example in the case of a situation according to FIG. 6, in which the locking jams. If overload is detected by the microcontroller 25, the direction of rotation of the electric motor 19 is preferably reserved independently to displace the locking part 17 back into the lid release position according to FIG. 3.

In response to registered and correspondingly proper locking of the lid 10, the electric motor 8 preferably rotates the mixer 7 at the predetermined rotational speed. By turning off the mixer 7 or the electric motor 8, which drives it, respectively, which turn-off can also take place in a time-controlled and/or recipe-controlled manner, the locking of the lid 10 is preferably released independently by means of the kitchen appliance 1 or controlled via the microcontroller 25, respectively. Accordingly, the electric motor 19, which rotationally displaces the locking part 17, is preferably activated with reversed direction of rotation so as to displace the locking part 17 from the lid locking position into the lid release position according to FIG. 3.

More preferably, the opening or the re-displacement, respectively, of the locking part or of the locking parts 17 takes place only after a predetermined time has lapsed, starting with the standstill of the mixer 7. The standstill of the mixer 7 can be detected via a further sensor, which sensor signal is evaluated by the microcontroller 25. In a preferred embodiment, respective values are stored in a preferably non-volatile memory, thus in particular time values, within which the mixer 7 comes to a standstill in response to certain rotational speeds after the electric motor 8, which drives said mixer 7, is turned off. It is also possible to only store one value, which captures all possible rotational speed ranges of the mixer 7, in this regard.

The microcontroller 25 thus releases the locking, for example after one second has lapsed, furthermore for example two seconds after the electric motor 8 has been turned off.

More preferably, the microcontroller 25 releases the locking only after a further predetermined time after the standstill of the mixer 7. During the mixing operation, a liquid column can built, which acts on the bottom side against the lid 10, in particular when a liquid is located in the mixing container 6. With the standstill of the mixer 7, this liquid column is reduced depending on the chosen rotational speed, if applicable only with a delay, so that a premature release of the lid 10 can quasi lead to a dislodging and furthermore to a liquid escape. To counteract this, the release of the locking, that is, the displacement of the locking part or of the locking parts 17 into, the lid release position according to FIG. 3 is further time-delayed. In this time, a liquid column, which might be present, is at least reduced to the extent that there is no risk for liquid to squirt out.

More preferably, this predetermined time after standstill of the mixer 7 is a function of the rotational speed, accordingly a function of the preselected rotational speed setting. The higher the rotational speed of the mixer 7 is chosen, the longer the delay period between standstill of the mixer 7 and locking release.

Preferably, corresponding time values are also stored in this regard depending on the rotational speeds or rotational speed stages, respectively. More preferably, the delay time between standstill of the mixer 7 and locking release in the case of rotational speeds of the mixer 7 of up to 1,000 U/min are zero, up to one second, for example, because the risk of a liquid column does not exist in the case of such relatively low revolutions, or because such a column drops almost immediately when the mixer 7 is turned off. In the case of higher rotational speeds of several 1,000 U/min, for example 8,000 to 10,000 U/min, a delay between standstill of the mixer 7 and locking release of several seconds is preferably at hand, for example two to five seconds.

All of the disclosed features (alone) are significant for the invention. The disclosure content of the corresponding/ enclosed priority documents (copy of the earlier application) is hereby also included in its entirety into the disclosure of the application, also for the purpose of adding features from these documents into claims of the instant application. In their optionally independent version, the subclaims characterized independent inventive further developments of the state of the art, in particular for filing divisional applications on the basis of these claims.

| List of Reference Numerals: | |
|---|---|
| 1 | kitchen appliance |
| 2 | operating field |
| 3 | controller |
| 4 | display |
| 5 | container accommodation |
| 6 | mixing container |
| 7 | mixer |
| 8 | electric motor |
| 9 | power cord |
| 10 | lid |
| 11 | filling opening |
| 12 | container wall |
| 13 | container edge |
| 14 | crown surface |
| 15 | collar |
| 16 | lid edge |
| 17 | locking part |
| 18 | reduction gear train |
| 19 | electric motor |
| 20 | cavity |
| 21 | engagement section |
| 22 | cavity section |
| 23 | support area |
| 24 | push button |
| 25 | microcontroller |
| 26 | sensor |
| 27 | pin |
| x | axis |
| y | axis of rotation |

The invention claimed is:

1. An electrically operated kitchen appliance, comprising a first electric motor, a second electric motor, a mixing container, a mixer in the mixing container operated by the second electric motor, a locking part and a lid for the mixing container that is lockable by the first electric motor and the locking part, wherein:

the first electric motor producing the locking has an output power of 1 to 10 watts; and the first electric motor acts on the locking part, wherein between the first electric motor and the locking part is a reduction gear train having a reduction greater than 50:1; and the first electric motor is a direct-current motor.

2. The kitchen appliance according to claim 1 wherein the locking operation takes place at least partially in overload operation.

3. The kitchen appliance according to claim 1, wherein the motor current of the first electric motor can be evaluated.

4. The kitchen appliance according to claim 1, wherein the direction of rotation of the first electric motor can be reversed.

5. The kitchen appliance according to claim 1, wherein a torque limitation can be carried out by monitoring the motor current.

6. The kitchen appliance according to claim 1, wherein a turn-off is made possible in response to overload by monitoring the motor current.

7. The kitchen appliance according claim 1, wherein a reversal of the direction of rotation can be triggered by monitoring the motor current.

8. The kitchen appliance according to claim 1, wherein the kitchen appliance is designed in such a way that, when a rotational speed of the mixer is preselected, the first electric motor first performs the lid locking independently and the second electric motor is released to drive the mixer thereafter.

9. The kitchen appliance according to claim 8 wherein after the time, for which a certain rotational speed had been preselected, has lapsed and the mixer was driven accordingly, an opening of the lid locking takes place independently, wherein the opening takes place after a predetermined time has lapsed, starting with the standstill of the mixer.

10. The kitchen appliance according to claim 8, wherein the predetermined time is different depending on the preselected rotational speed.

11. The electrically operated kitchen appliance according to claim 1, wherein the lid is lockable from a locking state open, wherein the kitchen appliance is designed in such a way that the locking must have taken place within a certain period of time, for the purpose of which provision is made for sensors, which detect that the locking took place, and, in the alternative, an error message is output and/or the locking is set back into the state open.

12. The kitchen appliance according to claim 11 wherein the predetermined locking time is less than 2 seconds, up to less than 0.5 seconds.

13. The kitchen appliance according to claim 1, wherein the reduction gear train has a reduction greater than 50:1 to 200:1.

14. The kitchen appliance according to claim 1, wherein the first electric motor is a comparatively small electric motor.

* * * * *